(12) United States Patent
Adireddy et al.

(10) Patent No.: US 11,433,917 B2
(45) Date of Patent: Sep. 6, 2022

(54) SYSTEM AND METHOD OF HUMAN INTERFACE FOR RECOMMENDED PATH

(71) Applicant: Continental Automotive Systems, Inc., Auburn Hills, MI (US)

(72) Inventors: Ganesh Adireddy, Bloomfield Hills, MI (US); Javier Adolfo Alcazar Olan, Royal Oak, MI (US); Dominik Froehlich, Ferndale, MI (US); Ibro Muharemovic, Warren, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 16/675,485

(22) Filed: Nov. 6, 2019

(65) Prior Publication Data

US 2020/0207367 A1 Jul. 2, 2020

Related U.S. Application Data

(60) Provisional application No. 62/785,936, filed on Dec. 28, 2018.

(51) Int. Cl.
*B60W 50/16* (2020.01)
*G08G 1/0965* (2006.01)
(Continued)

(52) U.S. Cl.
CPC ........... *B60W 50/16* (2013.01); *G08G 1/0965* (2013.01); *G08G 1/096791* (2013.01);
(Continued)

(58) Field of Classification Search
CPC ............. B60W 50/16; B60W 2554/80; B60W 2556/65; B60W 2050/146; G08G 1/0965; G08G 1/096791; G08G 1/167; G08G 1/096758; G08G 1/096725; G08G 1/163; G01C 21/3492; G01C 21/20
See application file for complete search history.

(56) References Cited

U.S. PATENT DOCUMENTS 2,847,080 A     8/1958 Zworykin
5,742,141 A *   4/1998 Czekaj ................ B62D 15/028
                                                180/167
(Continued)

FOREIGN PATENT DOCUMENTS

KR      20170128684 A    11/2017

OTHER PUBLICATIONS

Notice of Allowance for U.S. Appl. No. 16/135,534, dated Apr. 16, 2021.

*Primary Examiner* — Adnan Aziz

(57) ABSTRACT

A disclosed vehicle guidance system includes a transceiver receiving information indicative of operating conditions of other vehicles along a roadway and a controller within a primary vehicle. The controller utilizes the received information indicative of operating conditions to determine a recommended vehicle path along the roadway responsive to the operation of the other vehicles, the position of the primary vehicle and a scenario selected based on both the information of operation of other vehicles and the position of the primary vehicle received by the controller. A communication device communicates the recommended vehicle path to the operator of the primary vehicle.

22 Claims, 5 Drawing Sheets

(51) Int. Cl.
  *G08G 1/0967* (2006.01)
  *B60W 50/14* (2020.01)
(52) U.S. Cl.
  CPC ... *B60W 2050/146* (2013.01); *B60W 2554/80* (2020.02); *B60W 2556/65* (2020.02)

(56) References Cited

U.S. PATENT DOCUMENTS

| | | | |
|---|---|---|---|
| 6,405,132 B1* | 6/2002 | Breed | G01S 7/4802 |
| | | | 701/301 |
| 6,529,831 B1* | 3/2003 | Smith | G08G 1/0965 |
| | | | 340/903 |
| 9,146,121 B2 | 9/2015 | Husain | |
| 9,672,734 B1* | 6/2017 | Ratnasingam | G08G 1/0968 |
| 9,679,487 B1* | 6/2017 | Hayward | G08G 1/162 |
| 9,701,245 B2* | 7/2017 | Green | B60W 50/16 |
| 9,805,601 B1* | 10/2017 | Fields | G06Q 40/08 |
| 9,827,811 B1* | 11/2017 | McNew | B60N 2/90 |
| 9,841,767 B1 | 12/2017 | Hayward | |
| 9,869,560 B2 | 1/2018 | Gordon et al. | |
| 9,988,047 B2 | 6/2018 | Johnson et al. | |
| 10,272,946 B2* | 4/2019 | Takamatsu | G05D 1/0248 |
| 10,284,317 B1 | 5/2019 | Sanchez et al. | |
| 10,384,678 B1 | 8/2019 | Konrardy et al. | |
| 10,565,873 B1* | 2/2020 | Christensen | G08G 1/0965 |
| 2004/0049323 A1* | 3/2004 | Tijerina | B60N 2/002 |
| | | | 701/1 |
| 2005/0187701 A1 | 8/2005 | Baney | |
| 2006/0185921 A1* | 8/2006 | Cieler | B60W 50/16 |
| | | | 180/204 |
| 2007/0132608 A1* | 6/2007 | Votaw | G08G 1/0965 |
| | | | 340/903 |
| 2009/0119014 A1 | 5/2009 | Caplan | |
| 2010/0191421 A1* | 7/2010 | Nilsson | B62D 6/003 |
| | | | 701/41 |
| 2011/0035106 A1* | 2/2011 | Hauler | B62D 15/0265 |
| | | | 701/41 |
| 2012/0078506 A1 | 3/2012 | Husain | |
| 2014/0012494 A1 | 1/2014 | Cudak et al. | |
| 2014/0188376 A1* | 7/2014 | Gordon | G08G 1/09 |
| | | | 701/118 |
| 2014/0207377 A1* | 7/2014 | Gupta | G01C 21/3658 |
| | | | 701/533 |
| 2014/0346823 A1* | 11/2014 | Stebbins | B60N 2/986 |
| | | | 297/217.1 |
| 2015/0161913 A1* | 6/2015 | Dominguez | G09B 19/167 |
| | | | 434/65 |
| 2015/0166062 A1* | 6/2015 | Johnson | B60W 10/20 |
| | | | 701/41 |
| 2015/0175159 A1* | 6/2015 | Gussner | B60W 10/18 |
| | | | 701/1 |
| 2016/0063213 A1 | 3/2016 | Blue | |
| 2016/0084661 A1* | 3/2016 | Gautama | G01C 21/365 |
| | | | 701/400 |
| 2016/0093213 A1 | 3/2016 | Rider et al. | |
| 2016/0107570 A1* | 4/2016 | Modarres | B60Q 9/008 |
| | | | 340/435 |
| 2017/0030725 A1* | 2/2017 | Gordon | G01C 21/3492 |
| 2017/0050638 A1* | 2/2017 | Gordon | G05D 1/0289 |
| 2017/0052036 A1* | 2/2017 | Uno | G01C 21/3694 |
| 2017/0076598 A1* | 3/2017 | Scofield | G08G 1/096725 |
| 2017/0219369 A1 | 8/2017 | Lei et al. | |
| 2017/0301234 A1 | 10/2017 | Park | |
| 2018/0061230 A1* | 3/2018 | Madigan | B60W 40/09 |
| 2018/0086341 A1* | 3/2018 | Taniguchi | B62D 6/002 |
| 2018/0233047 A1 | 8/2018 | Mandeville-Clarke | |
| 2018/0247540 A1 | 8/2018 | Hagawa et al. | |
| 2018/0251066 A1* | 9/2018 | Murata | B60Q 9/00 |
| 2018/0286242 A1* | 10/2018 | Talamonti | B60W 30/14 |
| 2018/0299279 A1* | 10/2018 | Brown | G01C 21/3415 |
| 2018/0319327 A1* | 11/2018 | Cunningham, III | G08G 1/162 |
| 2018/0335781 A1* | 11/2018 | Chase | G08G 1/096758 |
| 2018/0348006 A1* | 12/2018 | Schad, Jr. | G01C 21/3605 |
| 2019/0027032 A1* | 1/2019 | Arunachalam | G08G 1/0965 |
| 2019/0047591 A1* | 2/2019 | Augst | B60Q 9/00 |
| 2019/0056733 A1* | 2/2019 | Ferguson | G05D 1/0214 |
| 2019/0092389 A1* | 3/2019 | McGill | B62D 5/006 |
| 2019/0120644 A1 | 4/2019 | Alcazar et al. | |
| 2019/0126942 A1* | 5/2019 | Goto | B60Q 9/00 |
| 2019/0315375 A1* | 10/2019 | Li | G01C 21/3652 |
| 2019/0316922 A1* | 10/2019 | Petersen | G01C 21/3617 |
| 2020/0070888 A1* | 3/2020 | Millsap | B62D 6/04 |
| 2020/0182636 A1* | 6/2020 | Ningthoujam | G01C 21/3415 |

* cited by examiner

SYSTEM AND METHOD OF HUMAN INTERFACE FOR RECOMMENDED PATH

CROSS REFERENCE TO RELATED APPLICATION

This application claims priority to U.S. Provisional Application Ser. No. 62/785,936 filed on Dec. 28, 2018.

TECHNICAL FIELD

The present disclosure relates to a system and method of generating and communicating a recommended path for a motor vehicle.

BACKGROUND

Motor vehicles operate on crowded roadways and highways and require a driver to continually assess and modify a vehicle's path. Although a driver may be alert and competent in the assessment of the vehicle's path, some circumstances and events may be beyond the driver's ability to recognize and perceive changing traffic patterns or the presence of emergency vehicles.

Accordingly, it is desirable to design and develop a system that can provide guidance to a vehicle operator as to a most desirable vehicle path.

SUMMARY

A process for communicating a recommended vehicle path to a driver according to an exemplary embodiment of this disclosure, among other possible things includes receiving information indicative of the operation of other vehicles along the roadway with a transceiver and controller mounted within the vehicle. The controller further receives information indicative of information of the primary vehicle. A recommended vehicle path along the roadway is then determined responsive to operation of the other vehicles, the position of the other vehicles and the position of the primary vehicle received by the controller and the recommended vehicle path is communicated to the operator of the primary vehicle.

In a further embodiment of the foregoing process for communicating a recommended vehicle path to a driver, information indicative of operation of the other vehicles is received directly from transmissions emitted by other vehicles proximate to the primary vehicle.

In a further embodiment of any of the foregoing processes for communicating a recommended vehicle path to a driver, information indicative of operation of the other vehicles is received from stationary systems gathering information on the other vehicles.

In a further embodiment of any of the foregoing processes for communicating a recommended vehicle path to a driver, the selected scenario is selected based on a determination that one of the other vehicles is an emergency vehicle that is stationary on the roadside ahead of the primary vehicle and the recommended path comprises at least one of a slowing a speed of the primary vehicle and changing lanes away from the stationary emergency vehicle.

In a further embodiment of any of the foregoing processes for communicating a recommended vehicle path to a driver, the selected scenario is selected based on a determination that one of the other vehicles is an oncoming emergency vehicle moving through traffic behind the primary vehicle and recommended path comprises at least one of a slowing a speed of the primary vehicle and changing lanes away from the oncoming emergency vehicle.

In a further embodiment of any of the foregoing processes for communicating a recommended vehicle path to a driver, the selected scenario is selected based on a determination that the other vehicles are moving below a desired speed of the primary vehicle and the recommended path comprises a series of lane changes around the other vehicles.

In a further embodiment of any of the foregoing processes for communicating a recommended vehicle path to a driver, the selected scenario is selected based on a determination that one of the other vehicles is moving faster than the primary vehicle and the recommended path comprises at least one of a slowing and a lane changes to accommodate faster moving other vehicles.

In a further embodiment of any of the foregoing processes for communicating a recommended vehicle path to a driver, a visual representation of the roadway and other vehicles is generated on a display including the recommended path.

In a further embodiment of any of the foregoing processes for communicating a recommended vehicle path to a driver, a physical feedback is generated to the operator of the primary vehicle to encourage operation of the vehicle along the recommended path.

A vehicle guidance system according to another exemplary embodiment, includes, among other possible things, a transceiver receiving information indicative of operating conditions of other vehicles along a roadway, a controller within a primary vehicle utilizing the received information indicative of operating conditions to determine a recommended vehicle path along the roadway responsive to the operation of the other vehicles, the position of the primary vehicle and a scenario selected based on both the information of operation of other vehicles and the position of the primary vehicle received by the controller and a communication device communicating the recommended vehicle path to the operator of the primary vehicle.

In a further example embodiment of the foregoing vehicle guidance system, the communication device comprises a display viewable from within the cabin of the primary vehicle, wherein the display is configured to generate an image representing the other vehicles and the recommended path.

In a further example embodiment of any of the foregoing vehicle guidance systems, the communication device comprises a haptic feedback system that generates a physical indication to prompt an operator of the primary vehicle to modify the vehicle path according to the recommended path.

In a further example embodiment of any of the foregoing vehicle guidance systems, the haptic feedback system comprises at least one of a steering assist mechanism or a seat feedback system.

In a further example embodiment of any of the foregoing vehicle guidance systems, the recommended path is generated based on a current direction of the primary vehicle without consideration of a destination.

In a further example embodiment of any of the foregoing vehicle guidance systems, the transceiver comprises a dedicated short range and/or over-the-air communication device for communicating between other vehicles proximate the primary vehicle.

In a further example embodiment of any of the foregoing vehicle guidance systems, the transceiver is configured to receive communication for a stationary communication device regarding the operating conditions of the other vehicles.

In a further example embodiment of any of the foregoing vehicle guidance systems, the controller is configured to determine the recommended vehicle path based on the selected scenario, wherein the selected scenario is one of a stationary emergency vehicle scenario, a moving emergency vehicle scenario, or primary vehicle passing scenario.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
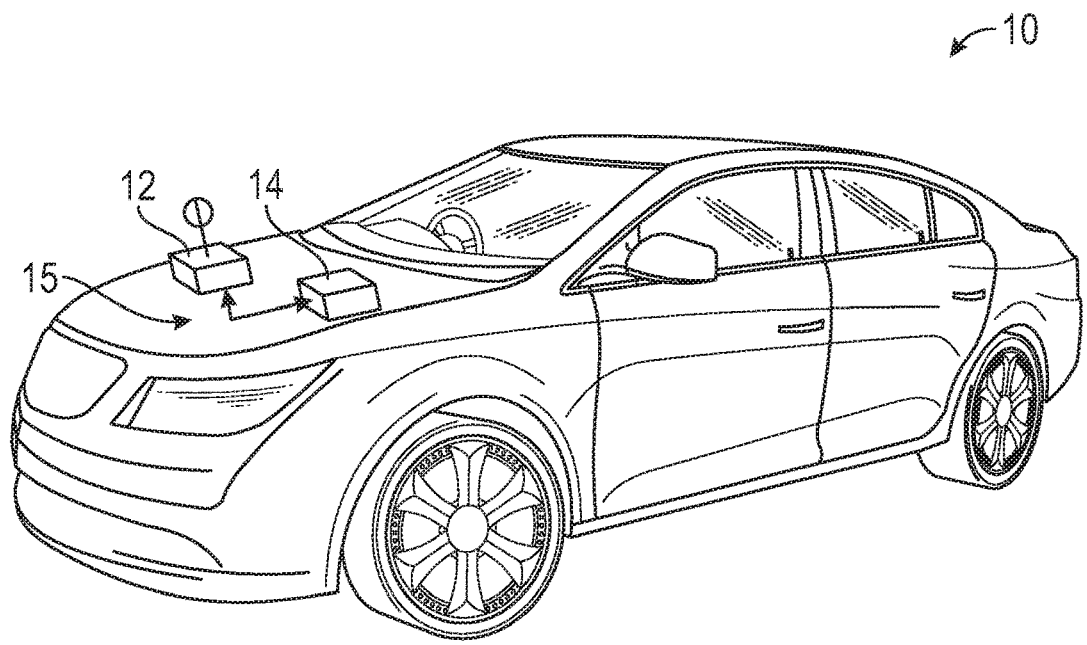
FIG. 1 is a schematic representation of a motor vehicle including a vehicle guidance system.
Figure 2:
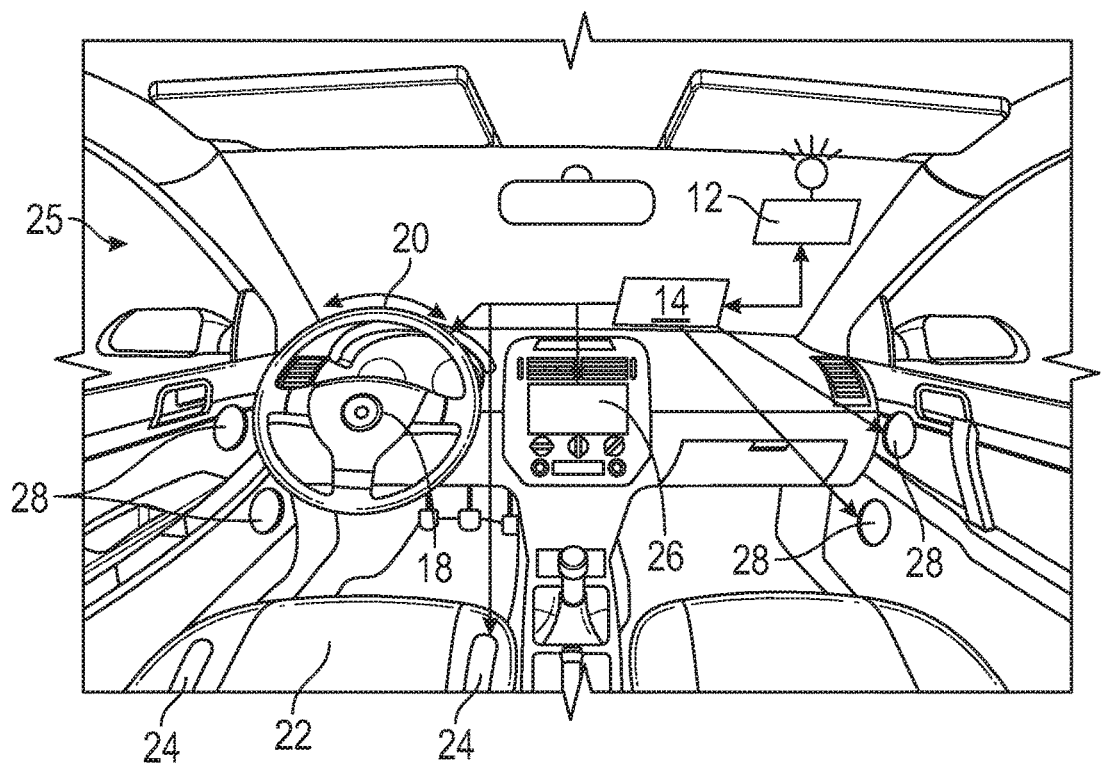
FIG. 2 is a schematic representation of a cabin of the motor vehicle.

Referring to FIGS. 1 and 2, a motor vehicle 10 includes a vehicle guidance system 15 including a transceiver 12 and a controller 14. The transceiver 12, in one example embodiment, is a dedicated short-range communication (DSRC) capable device for communicating with other DSRC capable devices in other vehicles and stationary communication devices proximate the vehicle 10 and a roadway. The transceiver 12 may also be any wireless over-the-air communication device that provides a capability of communicating between proximate vehicles.

The example vehicle guidance system 15 utilizes information obtained from other vehicles on the roadway proximate the vehicle 10 to define a recommended path through traffic and communicate that path to a vehicle operator. The recommended path is not a map to a final destination, but is instead a short-range recommended path relevant to the specific vehicles and roadway immediately present near the vehicle.

The example vehicle 10 includes a vehicle cabin 25 that includes a display 26, speakers 28, seats 22 and a steering wheel 20. The display 26 communicates information regarding a recommended path provided by the controller 14. The controller 14 instructs the display 26 to generate a visual representation of surrounding traffic and a recommended path for the vehicle through the traffic that is viewed a vehicle operator. The operator may choose to follow the recommended path or follow a different path. The example guidance system 15 does not control the vehicle 10 nor provide directions to a specific location. Instead, the example guidance system 15 provides a recommended path to provide information to a driver that may not be available to the driver by merely looking ahead in vehicle traffic. The information is provided to the vehicle 10 by other surrounding vehicles proximate the vehicle as well as stationary transmitting devices that are gathering information relative to vehicle traffic.

The example system 15 may communicate a recommended path to the driver through other means. In one disclosed embodiment, the display 26 will generate an image indicative of vehicles and the roadway along with a graphical representation of the recommended path. In another example embodiment, the system 15 provides audio prompts for the driver through the speakers 28 disposed within the vehicle cabin 25. The audio prompts include specific instructions for the operator to follow the recommended path. The prompts may instruct the operator when to change lanes and what speed is best suited to proceed along the recommended path.

The system 15 may also provide haptic prompts to the vehicle operator through actuation of haptic prompt devices in the seat 22 and steering wheel 20. In this disclosed example, the seat 22 includes haptic devices 24 on each side of the seat. A physical prompt by one of the haptic devices 24 prompts lane changes to the left and right corresponding to each side of the seat. The physical input from the haptic devices can be pulsing, constant or in different defined patterns to communicate lane changes and turns. Moreover, concurrent actuation of both haptic devices 24 could be utilized to communicate recommended speed changes or other predefined vehicle operation.

A haptic device 18 within the steering wheel 20 can nudge the operator according to lane changes and turns generated for the recommended path. The nudges of the steering wheel 20 do not steer the vehicle or change course, but encourage the driver to maneuver the vehicle along the recommended path. The nudge may not be an actual movement but instead an increase in effort when turning in an undesired direction in contrast with an easier effort for a turn or lane change in the recommended direction. It should be appreciated that although several embodiments of devices for communicating a recommended path to an operator are disclosed by way of example, other communication devices are within the contemplation and scope of this disclosure.

Figure 3:
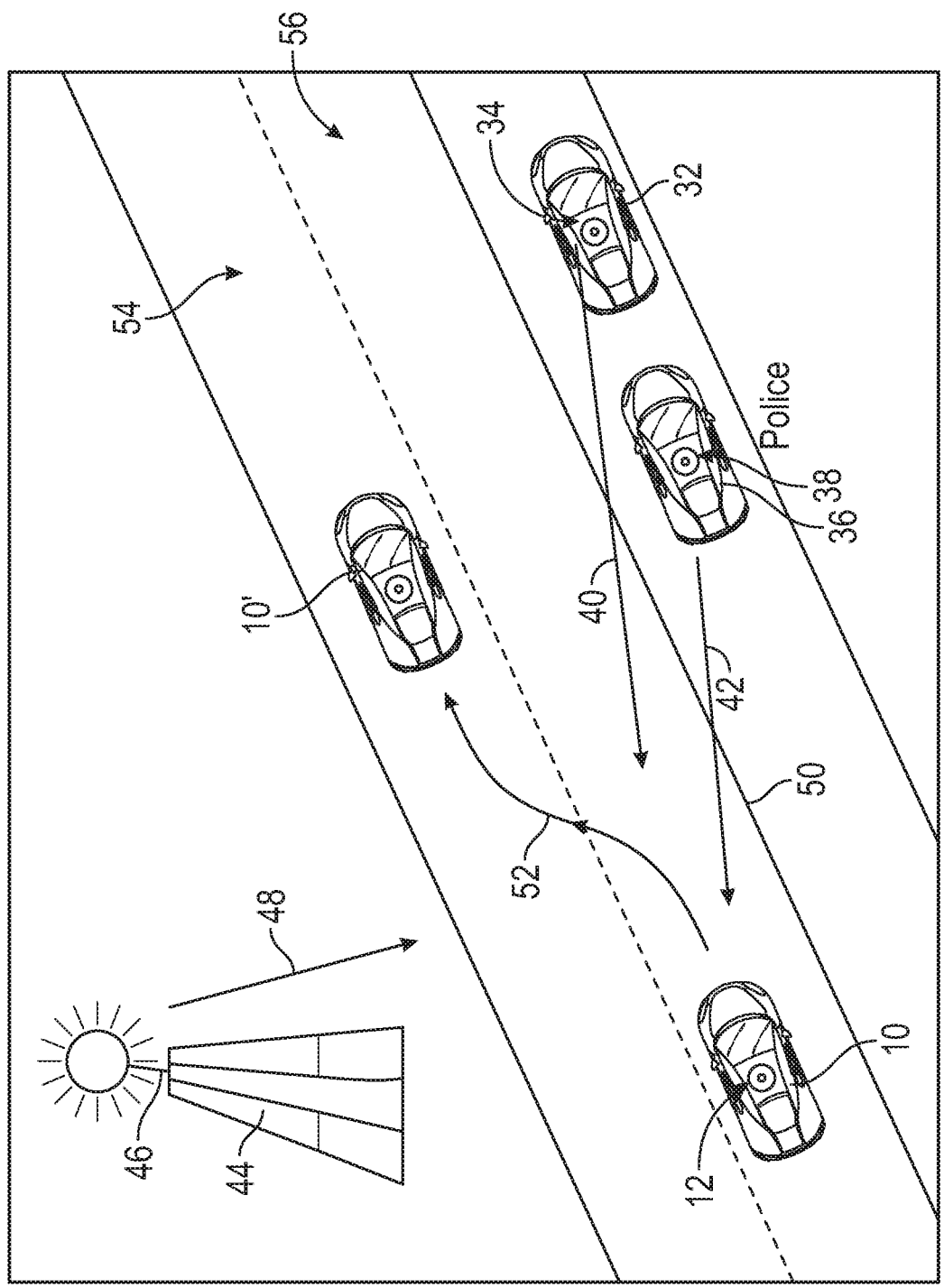
FIG. 3 is a schematic representation of a first recommended path scenario.

Referring to FIG. 3, with continued reference to FIGS. 1 and 2, a schematic illustration of an example image as would be provided on the display 26. The disclosed image includes annotations to explain features and generation of the recommended path.

In this example, a recommended path 52 for a primary vehicle 10 is generated according to a scenario where an emergency vehicle, such as an example police vehicle indicated at 36 is just off the roadway 50 with another vehicle 32. It is understood that a vehicle 10 approaching an emergency vehicle 36 on the side of the road is obligated by local traffic laws and also for safety purposes for the vehicle 10 to move over a lane when possible. In this disclosed example scenario, the primary vehicle 10 receives information transmitted from both the police vehicle 36 and the other vehicle 32 indicated by arrows 42 and 40 respectively. The police vehicle 36 includes a transceiver 38 and the other vehicle includes a transceiver 34 that transmit the signals 42, 40. The signals 40, 42 are received by the guidance system 15 of the primary vehicle 10.

Additionally, a stationary transceiver 46 mounted to a tower 44 or other physical stationary structure may also transmit a signal 48 that is received by the primary vehicle 10. As appreciated, in circumstances where neither the police vehicle 36 nor the other vehicle 32 include a transceiver, the stationary transceiver 46 may provide information on the traffic situation to the primary vehicle. It should be noted that although the example image is such that the operator may clearly see the emergency vehicle 36 and the other vehicle pulled to the side of the roadway, the example system 15 may provide the recommended path 52 as a reminder. Moreover, in some instances, the police vehicle 36 and the other vehicle 32 may not be visible by the operator due to the roadway, other vehicles or obstacles. In such circumstances, the guidance system 15 provides an alert to the operator that eases the transition of the primary vehicle to a safer lane.

The primary vehicle 10 receives information from the signals 40, 42 and 48 and generates the recommended path illustrated at 52. The recommended path 52 is determined responsive to the specific scenario including a police vehicle 36 pulled to the side of the shoulder. The received signals 42, 40, and 48 provide an indication of the location and speed of other vehicles in the roadway 50. The controller 14 also uses the received signals to determine what scenario applies to the specific situation. In this instance, the signals 42 and 40 communicate to the controller 14 that the scenario involves a police vehicle 36 pulled off the roadway 50. The controller 14 will then consider the presence of other vehicles and the lanes 54, 56 available in the roadway 50 to generate the recommended path 52. In this example, the recommended path 52 includes slowing the vehicle 10 and moving the vehicle 10 from a near lane 56 to a far lane 54 to provide the safest route around the police vehicle 36. In this illustrated example, because there are other vehicles on the roadway, the recommended path 52 is simple. However, should additional vehicles be present, the recommended path 52 would account for the speed and position of the other vehicles and modify the recommended path 52. Accordingly, in this example, the guidance system 15 has recommended the path 52. The primary vehicle 10 can follow the recommended path 52 such that it is in a location illustrated at 10' when it passes the police vehicle 36 and the other vehicle 32.

Figure 4:
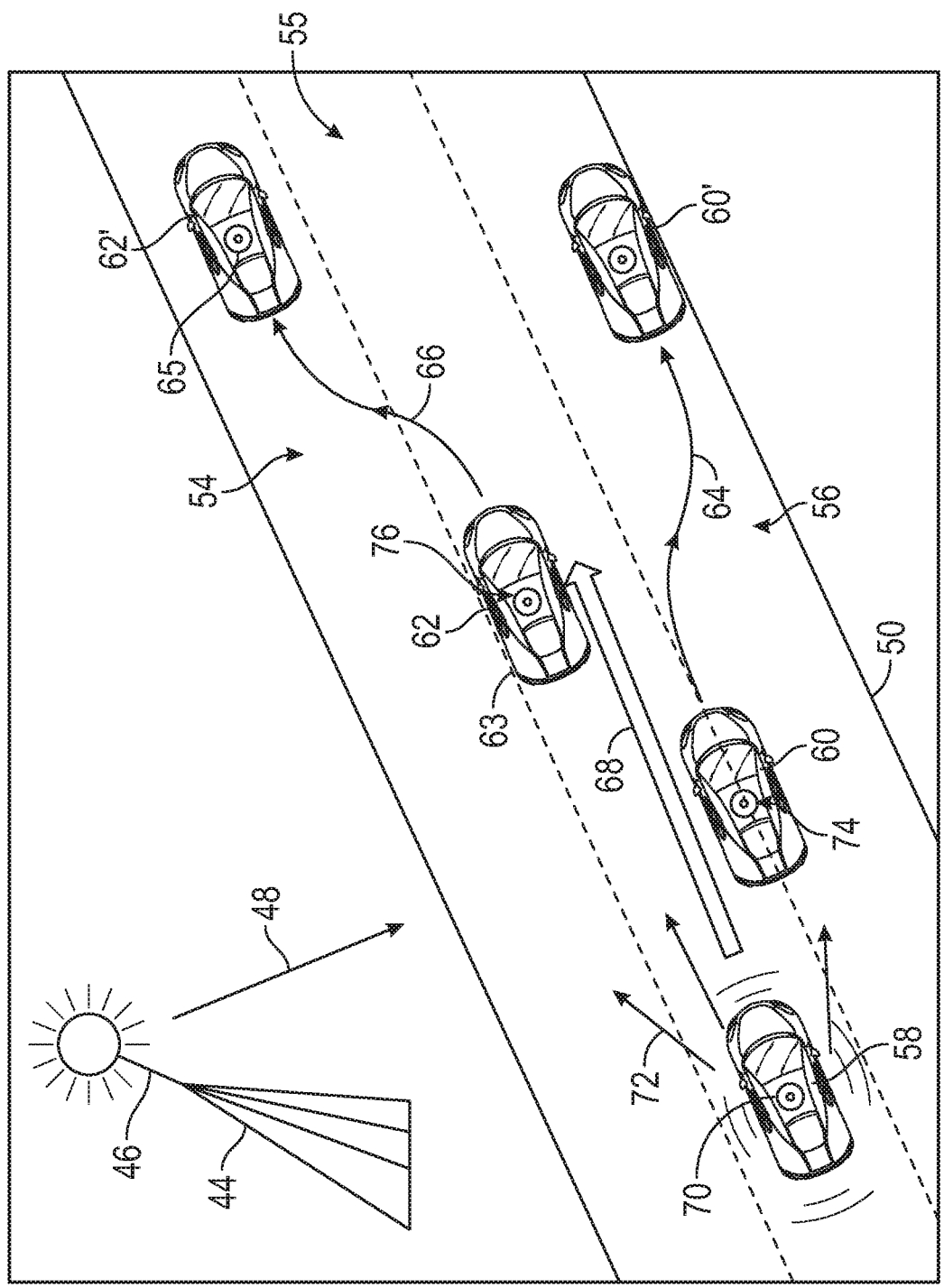
FIG. 4 is a schematic representation of second recommended path scenario.

Referring to FIG. 4, another example scenario includes an emergency vehicle 58 approaching vehicles 60 and 62 on the roadway 50. The vehicles 60 and 62 are spread across lanes 54, 55, and 56 of the roadway 50. Each of the vehicles 60 and 62 include a vehicle guidance system 15 and a transceiver 74, 76. The emergency vehicle 58 also includes a guidance system 15. Transceiver 70 of the emergency vehicle as well as transceivers 74 and 76 of the vehicles 60, 62 all transmit signals. Guidance systems 15 in each of the vehicles 58, 60 and 62 use the signals to generate a recommended path that is suitable for that specific vehicle. The vehicles 60, 62 transmit signals 63, 65 that are received by the other vehicle and the emergency vehicle 58. The vehicles 60, 62 also receive the signal 72 from the emergency vehicle 58. Additionally, all of the vehicles 58, 60 and 62 receive signals 48 from any stationary transceivers 46 within the area. The information shared between vehicles 58, 60 and 62 is used to generate recommended efficient and safe paths for each vehicle. Moreover, in this example the scenario is recognized as yielding to the emergency vehicle 58 to enable the emergency vehicle 58 to pass each of the other vehicles 60, 62.

In this disclosed example, the emergency vehicle can be a firetruck or ambulance that is proceeding down the center lane 55. The emergency vehicle 58 transmits signals 72 that are received by the other vehicle 60 and 62. The other vehicles utilize the information communicated from signals 48 of the stationary transceiver 46 and 72 from the emergency vehicle 58 to generate separate recommended paths 64, 66. The recommended paths are generated by systems 15 in each respective vehicle 60, 62. The controller 14 recognizes the signal 72 from the emergency vehicle 58 and prepares the recommended paths 64, 66 based on the saved scenario used after recognition of an approaching emergency vehicle. The saved scenario may include a set of guidelines and parameters that define generation of the recommended path. In this instance, the saved scenario regarding emergency vehicles would include yielding to the emergency vehicle. Additional guidelines would be defined for each scenario and may be increasingly specific to provide a desired recommended path. The scenario and guidelines for each vehicle may be different. Moreover, the scenario and guidelines utilized to generate the recommended path of the emergency vehicle would be much different than those used for the other vehicles 60, 62.

Recommended paths 64, 66 and 68 for this scenario provide a safe route for the emergency vehicle 58 and also for the other vehicles 60 and 62. The recommended path may also include recommendations for reducing or increasing vehicle speed to reduce dangers caused by operation and in view of the approaching speed of the emergency vehicle 58. Accordingly, in this example, the path 64 moves the vehicle 60 from its first position to a second position of the vehicle indicated at 60'. Moreover, the other vehicle 62 may follow the recommended path 66 to end up in the far lane 54 at a point indicated by 62'. The path 68 for the emergency vehicle 58 includes maintaining the lane and speed as it passes the other vehicles 60, 62. As appreciated, each path is tailored to the individual vehicles, speeds and roadway present in each scenario.

Figure 5:
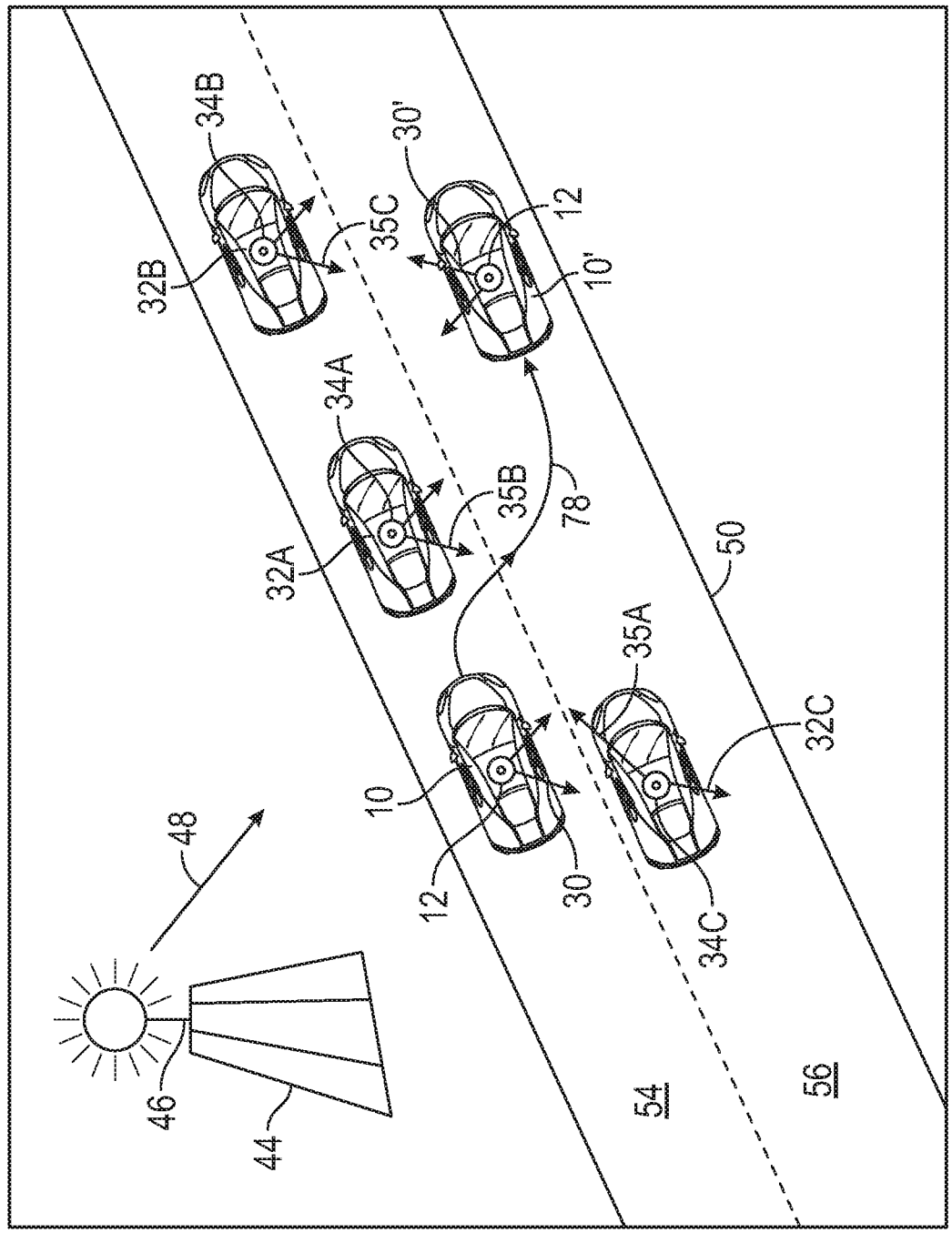
FIG. 5 is yet another schematic representation of a third recommended path scenario.

Referring to FIG. 5, with continued reference to FIGS. 1 and 2, the example guidance system 15 may also provide the primary vehicle 10 with a recommended path 78 around slower vehicles. In this example, the primary vehicle 10 receives information by way of signals 35A, 35B and 35C from vehicles 32A, 32B, and 32C. The vehicles 32A, 32B, and 32C are proceeding within the lanes 54 and 56. The primary vehicle 10 is traveling at a speed greater than that of those indicated for the vehicles 32A, 32B and 32C and therefore a recommended path 78 is generated to illustrate how a driver may avoid the slower traffic. In this example, the primary vehicle 10 generates a recommended path illustrated at 78 to move around the slower vehicles. The information signals 35A, 35B and 35C generated and transmitted by transceivers 34A, 34B and 34C from the other vehicles 32A, 32B, and 32C along with a stationary transceiver 46 communicates positon and speeds used to determine the path 78. The other vehicles 32A, 32B and 32C are also receiving information signals 30 regarding speed and position of the primary vehicle 10 and systems 15 in those vehicles may also be generating recommended paths. It should be appreciated that, although the example recommended path 78 is fairly simple, a more complex recommended path including several lane changes is within the contemplation and capacity of the disclosed guidance system 15.

Figure 6:
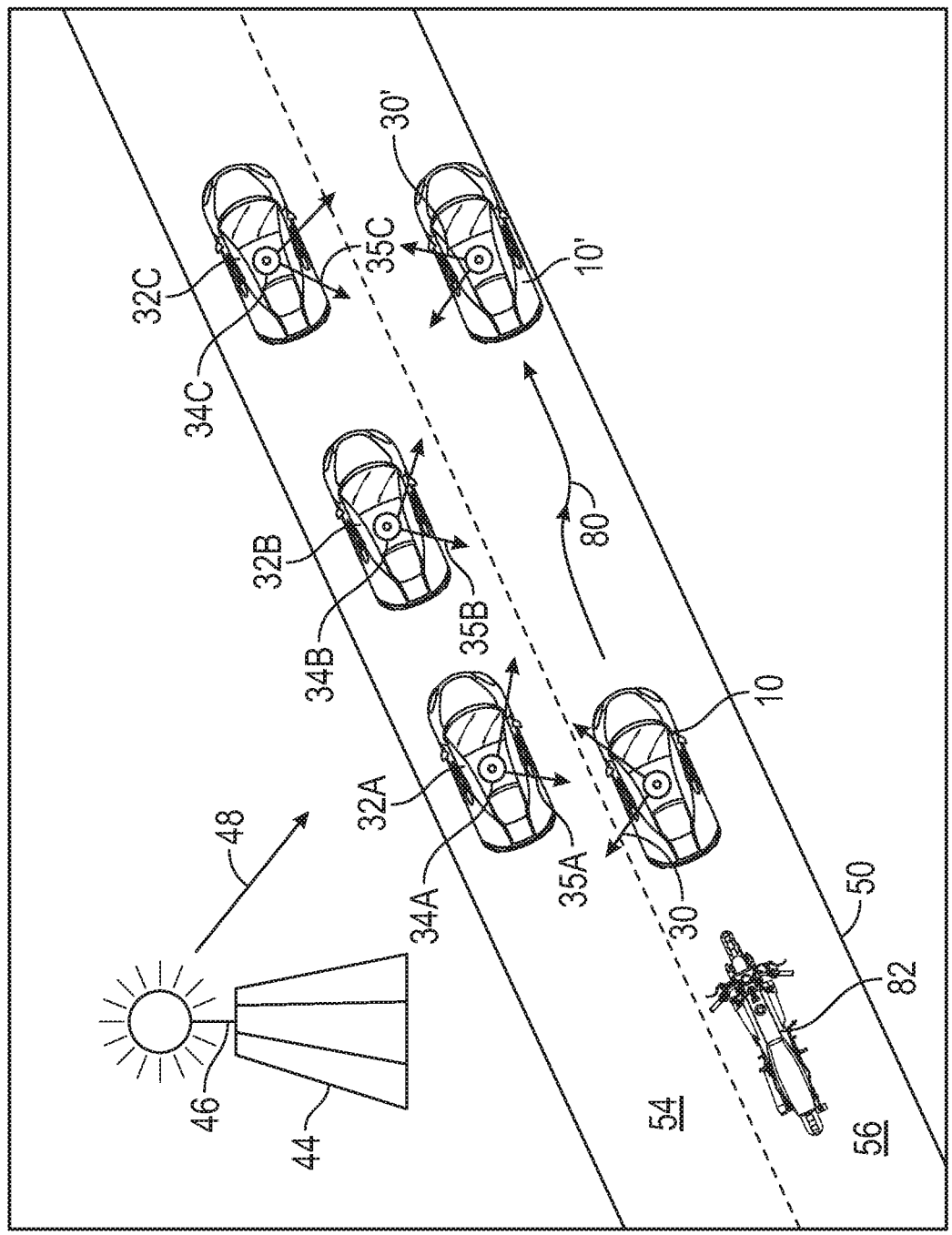
FIG. 6 is yet another schematic illustration of a fourth path scenario.

Referring to FIG. 6, with continued reference to FIGS. 1 and 2, another example scenario where a primary vehicle 10 including the example guidance system 15 alters its course in response to an approaching vehicle traveling at a rate of speed higher than that of the primary vehicle 10. In this scenario, the primary vehicle 10 receives information from other vehicles 32A, 32B, 32C along with the stationary transceiver 46 that is indicative of a speed and position of an approaching vehicle. In this example, the approaching vehicle is a motorcycle 82 and may be moving at a speed not desired nor advisable for the primary vehicle 10. Accordingly, the primary vehicle 10 interprets the scenario as that of a fast oncoming vehicle and generates the recommended path 80 to minimize interference while enabling the motorcycle 82 to pass. In this example, it is not feasible for the primary vehicle 10 to change lanes due to the other vehicles 32A, 32B and 32C. Accordingly, the recommended path 80 is to move the primary vehicle 10 as far to the side of the roadway 50 as possible to enable the motorcycle 82 to pass if desired.

The motorcycle 82 in this example is not transmitting any information. Instead, the other vehicles 32A, 32B and 32C observe the oncoming motorcycle 82 and communicates that information by signals 35A, 35B and 35C to other proximate vehicles such as the primary vehicle 10. Additionally, information from proximate stationary receivers 46 provide further information for the system 15 to produce a recommended path. In this example scenario, the guidance system 15 accumulates all available information, identifies a scenario in view of the information and generates a recommended path that is communicated to the driver. The driver may proceed along the recommended path or take another path. The system 15 will continually update the recommended path based on the position of the vehicle and the scenario that applicable based on the received information. In this example, the recommended path 80 is a relatively minor course modification to maximize room for the motorcycle 82 to pass.

Accordingly, the example guidance system includes features to generate a recommended path for a vehicle operator based on information accumulated from other vehicles and/or local transceivers to accommodate different vehicle positions, speeds, and circumstances that may not be visible or immediately understandable by a vehicle operator through normal visual means.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A process of communicating a recommended vehicle path comprising:
    receiving information indicative of operation of other vehicles along a roadway with a controller located within a primary vehicle on the roadway driven by an operator;
    receiving information indicative of operation of the primary vehicle;
    determining a recommended vehicle path along the roadway responsive to the operation of the other vehicles, the position of the primary vehicle and a scenario selected based on both the information of operation of other vehicles and the position of the primary vehicle received by the controller; and
    communicating the recommended vehicle path to the operator of the primary vehicle, comprising selecting and providing by a plurality of haptic devices to the operator of the primary vehicle at least one haptic pattern from a plurality of different defined haptic patterns to communicate different maneuvers of the primary vehicle along the recommended vehicle path, wherein the selected at least one haptic pattern comprises a first haptic pattern on a left side of a driver seat of the primary vehicle if the recommended vehicle path is a lane change to the left, a second haptic pattern on a right side of the driver seat if the recommended vehicle path is a lane change to the right, and a third haptic pattern on the left side of the driver seat and a concurrent fourth haptic pattern on the right side of the driver seat if the recommended vehicle path includes a speed increase of the primary vehicle.

2. The process as recited in claim 1, including receiving the information indicative of operation of the other vehicles directly from transmissions emitted by other vehicles proximate to the primary vehicle.

3. The process as recited in claim 1, including receiving information indicative of operation of the other vehicles from stationary systems gathering information on the other vehicles.

4. The process as recited in claim 1, wherein the selected scenario is selected based on a determination that one of the other vehicles is an emergency vehicle that is stationary on a shoulder of the roadway ahead of the primary vehicle, a second of the other vehicles is stationary on a shoulder of the roadway ahead of the primary vehicle, and the recommended path comprises a slowing a speed of the primary vehicle and changing lanes in a direction away from the stationary emergency vehicle and the second of the other vehicles even though there is no object detected in the lane in which the primary vehicle is traveling that is forwardly of the primary vehicle, and wherein the information indicative of operation of the other vehicles is received from the stationary emergency vehicle and the stationary second of the other vehicles.

5. The process as recited in claim 1, wherein the selected scenario is selected based on a determination that one of the other vehicles is an oncoming emergency vehicle moving through traffic behind the primary vehicle and the recommended path comprises a slowing a speed of the primary vehicle and changing lanes away from the oncoming emergency vehicle.

6. The process as recited in claim 1, wherein the selected scenario is selected based on a determination that the other vehicles are moving below a desired speed of the primary vehicle and the recommended path comprises a series of lane changes around the other vehicles.

7. The process as recited in claim 1, wherein the selected scenario is selected based on a determination that one of the other vehicles is moving faster than the primary vehicle and the recommended path comprises at least one of a slowing and a lane changes to accommodate faster moving other vehicles.

8. The process as recited in claim 1, including generating a visual representation of the roadway and other vehicles on a display including the recommended path.

9. The process as recited in claim 8, including generating a physical feedback to the operator of the primary vehicle to encourage operation of the vehicle along the recommended path, comprising increasing resistance to rotation of a steering wheel of the primary vehicle when the steering wheel is rotated in a direction away from the recommended vehicle path, relative to a resistance to rotation of the steering wheel when turned in a direction along the recommended vehicle path.

10. The process according to claim 1, wherein the first, second, third and fourth haptic patterns each comprises a single, constant pattern.

11. A vehicle guidance system comprising:
    a transceiver receiving information indicative of operating conditions of other vehicles along a roadway;
    a controller within a primary vehicle utilizing the received information indicative of operating conditions to determine a recommended vehicle path along the roadway responsive to the operation of the other vehicles, the position of the primary vehicle and a scenario selected based on both the information of operation of other vehicles and the position of the primary vehicle received by the controller;

a communication device communicating the recommended vehicle path to the operator of the primary vehicle; wherein the communication device comprises a haptic feedback system that generates a physical indication to prompt an operator of the primary vehicle to modify the vehicle path according to the recommended path, the haptic feedback system comprising a haptic device associated with a steering wheel of the primary vehicle, the haptic device generating a physical feedback to the operator of the primary vehicle to encourage operation of the primary vehicle along the recommended path, the haptic device increasing resistance to rotation of a steering wheel of the primary vehicle when the steering wheel is turned in a direction away from the recommended vehicle path, relative to a resistance to rotation of the steering wheel in a direction along the recommended vehicle path, wherein the haptic feedback system comprises a second haptic device disposed relative to a left side of a driver seat of the primary vehicle, and a third haptic device disposed relative to a right side of the driver seat, wherein if the recommended vehicle path is a lane change to the left, the second haptic device is actuated to provide the physical indication as a first haptic pattern on the left side of the driver seat, and wherein if the recommended vehicle path is a lane change to the right, the third haptic device is actuated to provide the physical indication as a second haptic pattern on the right side of the driver seat, and wherein if the recommended vehicle path includes a speed increase of the primary vehicle, the second haptic device provides a third haptic pattern on the left side of the driver seat and the third haptic device concurrently provides a fourth haptic pattern on the right side of the driver seat.

12. The vehicle guidance system as recited in claim 11, wherein the communication device comprises a display viewable from within the cabin of the primary vehicle, wherein the display is configured to generate an image representing the other vehicles and the recommended path.

13. The vehicle guidance system as recited in claim 11, wherein the haptic feedback system comprises at least one of a steering assist mechanism or a seat feedback system.

14. The vehicle guidance system as recited in claim 11, wherein the recommended path is generated based on a current direction of the primary vehicle without consideration of a destination.

15. The vehicle guidance system as recited in claim 11, wherein the transceiver comprises a dedicated short range and/or over-the-air communication device for communicating between other vehicles proximate the primary vehicle.

16. The vehicle guidance system as recited in claim 11, wherein the transceiver is configured to receive communication for a stationary communication device regarding the operating conditions of the other vehicles.

17. The vehicle guidance system as recited in claim 11, wherein the controller is configured to determine the recommended vehicle path based on the selected scenario, wherein the selected scenario is one of a stationary emergency vehicle scenario, a moving emergency vehicle scenario, or primary vehicle passing scenario.

18. The process of claim 1, wherein the different maneuvers of the primary vehicle comprise at least one lane change along the roadway and at least one turn operation.

19. The vehicle guidance system as recited in claim 11, wherein the communication device provides to the operator of the primary vehicle at least one haptic pattern from a plurality of different defined haptic patterns to communicate different maneuvers of the primary vehicle along the recommended vehicle path.

20. The vehicle guidance system according to claim 11, wherein the first, second, third and fourth haptic patterns each comprises a single, constant pattern.

21. A vehicle guidance system comprising:
a transceiver receiving information indicative of operating conditions of other vehicles along a roadway;
a controller within a primary vehicle utilizing the received information indicative of operating conditions to determine a recommended vehicle path along the roadway responsive to the operation of the other vehicles, the position of the primary vehicle and a scenario selected based on both the information of operation of other vehicles and the position of the primary vehicle received by the controller; and
a communication device communicating the recommended vehicle path to the operator of the primary vehicle, wherein the communication device provides to an operator of the primary vehicle at least one haptic signal pattern from a plurality of different defined haptic signal patterns to communicate different maneuvers of the primary vehicle along the recommended vehicle path,
wherein the communication device comprises at least one haptic device disposed relative to a driver seat of the primary vehicle,
wherein if the recommended vehicle path is a lane change to the left, the at least one haptic device is actuated to provide the at least one haptic signal pattern on the left side of the driver seat,
wherein if the recommended vehicle path is a lane change to the right, the at least one haptic device is actuated to provide the at least one haptic signal pattern on the right side of the driver seat, and
wherein if the recommended vehicle path includes a speed increase of the primary vehicle, the at least one haptic device provides the at least one haptic signal pattern concurrently on the left side of the driver seat and on the right side of the driver seat.

22. The vehicle guidance system according to claim 21, wherein the first, second, third and fourth haptic patterns each comprises a single, constant pattern.

* * * * *